United States Patent
Long et al.

(10) Patent No.: US 10,158,896 B2
(45) Date of Patent: Dec. 18, 2018

(54) VIDEO CHANNEL ALLOCATION MANAGEMENT METHOD AND RELATED DEVICE, AND COMMUNICATION SYSTEM

(71) Applicant: TENCENT TECHNOLOGY (SHENZHEN) COMPANY LIMITED, Shenzhen (CN)

(72) Inventors: Jinyuan Long, Shenzhen (CN); Xinhai Zeng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/138,442

(22) Filed: Apr. 26, 2016

(65) Prior Publication Data
US 2016/0241889 A1  Aug. 18, 2016

Related U.S. Application Data

(63) Continuation of application No. PCT/CN2014/088292, filed on Oct. 10, 2014.

(30) Foreign Application Priority Data

Oct. 31, 2013 (CN) .......................... 2013 1 0532569

(51) Int. Cl.
H04N 21/24 (2011.01)
H04N 21/2385 (2011.01)
H04N 21/845 (2011.01)

(52) U.S. Cl.
CPC ..... *H04N 21/2385* (2013.01); *H04N 21/2402* (2013.01); *H04N 21/8456* (2013.01)

(58) Field of Classification Search
CPC combination set(s) only.
See application file for complete search history.

(56) References Cited

U.S. PATENT DOCUMENTS

| | | | |
|---|---|---|---|
| 7,313,810 B1 * | 12/2007 | Bell ..................... | H04H 20/103 348/E7.063 |
| 7,765,568 B1 * | 7/2010 | Gagnon ................ | H04H 60/25 715/787 |

(Continued)

FOREIGN PATENT DOCUMENTS

| | | |
|---|---|---|
| CN | 101682702 A | 3/2010 |
| CN | 101841540 A | 9/2010 |

(Continued)

OTHER PUBLICATIONS

The World Intellectual Property Organization (WIPO) International Search Report for PCT/CN2014/088292 dated Dec. 30, 2014.

(Continued)

*Primary Examiner* — Kieu Oanh T Bui
(74) *Attorney, Agent, or Firm* — Anova Law Group, PLLC

(57) ABSTRACT

Embodiments of the present invention disclose a video channel allocation management method and related device, and a communication system. The video channel management method includes: receiving a first video data from a first user; querying a first video channel corresponding to the first user; if the first video channel corresponding to the first user is not found through the querying, allocating a second video to the first user, the second video channel being a channel that is currently timed out; and if the second video channel is allocated to the first user, writing the first video data to the second video channel, and tagging that the second video channel belongs to the first user. Technical solutions provided in the embodiments of the present invention facilitate improvement in video channel utilization efficiency, and then may reduce hardware resource deployment as much as possible.

20 Claims, 6 Drawing Sheets

(56) References Cited

U.S. PATENT DOCUMENTS

| | | | | |
|---|---|---|---|---|
| 8,839,317 B1* | 9/2014 | Rieger | ............... | H04N 21/2408 |
| | | | | 375/240.01 |
| 2013/0066885 A1 | 3/2013 | Komuves | | |
| 2013/0077554 A1* | 3/2013 | Gauvreau | ............... | H04L 5/001 |
| | | | | 370/312 |
| 2013/0145107 A1* | 6/2013 | Sadowski | ............. | G09G 5/397 |
| | | | | 711/149 |

FOREIGN PATENT DOCUMENTS

| | | |
|---|---|---|
| CN | 103282871 A | 9/2013 |
| CN | 103312907 A | 9/2013 |
| CN | 103561291 A | 2/2014 |
| EP | 1732255 A1 | 12/2006 |

OTHER PUBLICATIONS

The State Intellectual Property Office of the People's Republic of China (SIPO) Office Action 1 for 201310532569.8 dated Mar. 18, 2016 11 Pages (including translation).

* cited by examiner

VIDEO CHANNEL ALLOCATION MANAGEMENT METHOD AND RELATED DEVICE, AND COMMUNICATION SYSTEM

CROSS-REFERENCES TO RELATED APPLICATIONS

This application is a continuation of PCT Patent Application No. PCT/CN2014/088292, filed on Oct. 10, 2014, which claims priority to Chinese Patent Application No. 201310532569.8, entitled "VIDEO CHANNEL ALLOCATION MANAGEMENT METHOD AND RELATED DEVICE, AND COMMUNICATIONS SYSTEM" filed on Oct. 31, 2013, the entire contents of all of which are incorporated herein by reference.

FIELD OF THE TECHNOLOGY

The present invention relates to the field of computer technologies, and specifically to a video channel allocation management method and related device, and a communication system.

BACKGROUND OF THE DISCLOSURE

Currently, a video channel is a storage resource, in a video server, that is used for storing video data. Information such as a time stamp and a user identifier of a user to which the video channel currently belongs may be recorded in the video channel.

However, the video server generally allocates video channels of a quantity equal to a quantity of concurrent video users according to the quantity of the concurrent video users. As a result, the quantity of video channels that the video server can provide directly limits a maximum concurrent user number allowed by the video server, and therefore, for some specific time periods or scenarios in which a concurrent user number may be relatively large, video servers having more hardware resources are needed to provide corresponding video channels, which inevitably pushes up costs.

BRIEF SUMMARY OF THE DISCLOSURE

Embodiments of the present invention provide a video channel allocation management method and related device, and a communication system, so as to improve video channel utilization efficiency, and then reduce hardware resource deployment as much as possible.

A first aspect of the embodiments of the present invention provides a video channel management method, including: receiving a first video data from a first user; querying a first video channel corresponding to the first user; and if the first video channel corresponding to the first user is not found through the querying, allocating a second video channel to the first user, the second video channel being a channel that is currently timed out; and if the second video channel is allocated to the first user, writing the first video data to the second video channel, and tagging that the second video channel belongs to the first user.

A second aspect of the embodiments of the present invention provides a video server that may include: a receiving unit, configured to receive a first video data from a first user; a query unit, configured to query a first video channel corresponding to the first user; an allocation unit, configured to: if the query unit does not find the first video channel corresponding to the first user through the querying, allocate a second video channel to the first user, the second video channel being a channel that is currently timed out; and a writing unit, configured to: if the allocation unit allocates the second video channel to the first user, write the first video data to the second video channel, and tag that the second video channel belongs to the first user.

A third aspect of the embodiments of the present invention provides a communication system that may include: a user terminal and a video server. The user terminal may be configured to send a first video data from a first user to the video server. The video server may be configured to receive the first video data from the user terminal; query a first video channel corresponding to the first user; and if the first video channel corresponding to the first user is not found through the querying, allocate a second video channel to the first user, the second video channel being a channel that is currently timed out; and if the second video channel that is currently already timed out is allocated to the first user, write the first video data to the second video channel, and tag that the second video channel belongs to the first user, the user terminal belonging to the first user.

It can be seen from above that, in the solutions of the embodiments of the present invention, after receiving a first video data from a first user, a video server first queries a first video channel corresponding to the first user; and if the first video channel corresponding to the first user is not found through the querying, allocates a second video channel to the first user, the second video channel being a channel that is currently timed out; and if the second video channel is allocated to the first user, writes the first video data to the second video channel, and tags that the second video channel belongs to the first user. A video channel time management mechanism is introduced, and a video channel that is currently already timed out may be allocated again to and used by another user, so that at different moments, a same video channel may be allocated repetitively to and used by multiple different users, which greatly improves video channel utilization efficiency, and then may reduce hardware resource deployment as much as possible. Moreover, based on this mechanism, a video channel does not need to be fixedly allocated to each user, and therefore, a conventional video channel allocation mechanism may be abandoned, and the disclosed method and system can facilitate great increase in a quantity of access users allowed by the video server.

BRIEF DESCRIPTION OF THE DRAWINGS

To describe the technical solutions of the embodiments of the present invention more clearly, the accompanying drawings for illustrating the embodiments will be introduced briefly in the following. Apparently, the drawings in the following description are only some embodiments of the present invention, and a person of ordinary skill in the art may obtain other drawings based on these accompanying drawings without creative efforts.

DETAILED DESCRIPTION

Embodiments of the present invention provide a video channel allocation management method and related device, and a communication system, so as to improve video channel utilization efficiency, and then reduce hardware resource deployment as much as possible.

To make the solutions of the present invention more comprehensible for persons skilled in the art, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

The following describes each of the embodiments in detail.

In the specification, claims, and accompanying drawings of the present invention, the terms "first", "second", "third", "fourth" (if exists), and so on are intended to distinguish between similar objects but do not necessarily indicate a particular order or sequence. It should be understood that, terms used in this way can be interchanged in an appropriate case, so that the embodiments of the present invention that are described herein can be, for example, implemented in a sequence other than those sequences illustrated or described herein. In addition, terms "include" and "have" and any of their variations are intended to cover nonexclusive including, for example, a process, method, system, product, or device that includes a series of steps or units does not have to be limited to those clearly listed steps or units, but may include another step or unit that is not clearly listed or is inherent to the process, method, product, or device.

According to an embodiment, the present invention provides a video channel allocation management method, where the method may include: receiving, by a video server, a first video data from a first user; querying a first video channel corresponding to the first user; and if the first video channel corresponding to the first user is not found successfully through the querying, attempting to allocate a second video channel to the first user, the second video channel being a channel that is currently timed out, and if the second video channel is allocated to the first user successfully, writing the first video data to the second video channel, and tagging that the second video channel belongs to the first user.

Figure 1:
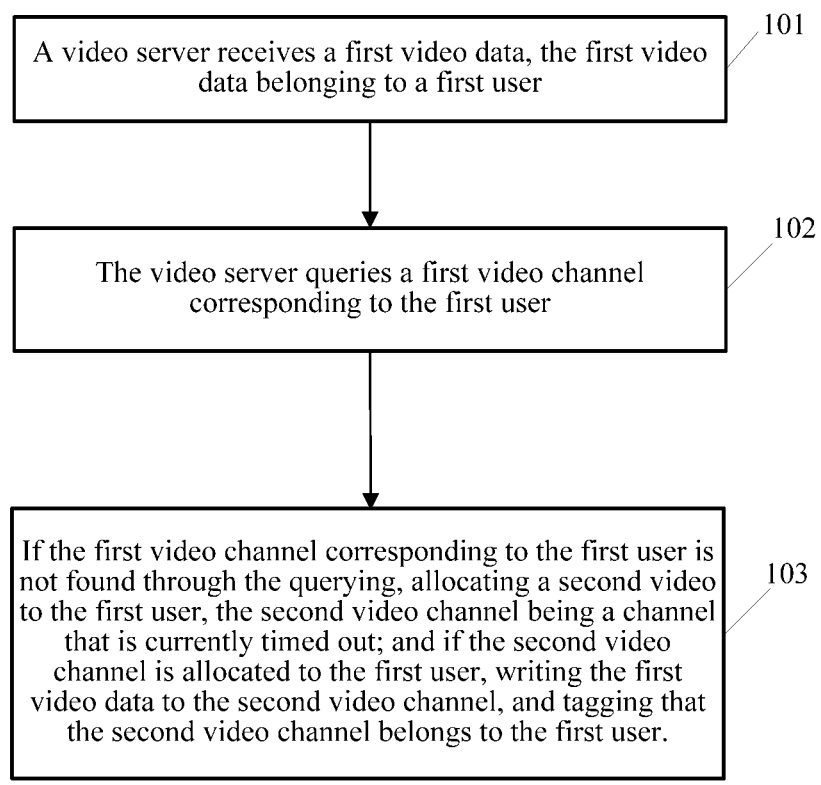
FIG. 1 is a schematic flowchart of a video channel allocation management method according to an embodiment of the present invention.

First referring to FIG. 1, FIG. 1 is a schematic flowchart of a video channel allocation management method according to an embodiment of the present invention. As shown in FIG. 1, the video channel allocation management method provided in this embodiment of the present invention may include the following contents.

101: A video server receives first video data.

For example, after a user terminal (which may be referred to as a first user terminal for convenience of quotation) establishes a connection to a video server, the first user terminal may send a piece of video data (which is referred to as first video data for convenience of quotation) to the video server, and the video server may receive the first video data from the first user terminal. The first user terminal sending the first video data belongs to a user (which may be referred to as a first user). The first video data may be live video data, and certainly may also be another type of video data packet.

A user terminal mentioned in each embodiment the present invention may be a personal computer, a mobile phone, a personal digital processing device or another type of user terminal.

102: The video server queries a first video channel corresponding to a first user to which the first video data belongs.

In some embodiments of the present invention, the first video data may further include, for example, a user identifier of the first user.

In some embodiments of the present invention, before receiving the first video data, the video server may already allocate a video channel to the first user, or may not yet allocate a video channel to the first user. For example, the video server may not allocate a video channel to the first user previously, or the video server may allocate a video channel previously allocated to the first user to another user, or the video server may reset a video channel previously allocated to the first user to an idle video channel, where the idle video channel does not belong to any user.

A video channel is a storage resource, in the video server, that is used for storing video data, such as a memory resource. Information such as a time stamp, and a user identifier of a user to which the video channel currently belongs may be recorded in the video channel.

In some embodiments of the present invention, the querying a first video channel corresponding to a first user to which the first video data belongs may include: searching, based on a multiple-Hash algorithm (or a traversal algorithm or another algorithm), for whether a record used for identifying a mapping relationship between the first user and the first video channel is stored in a mapping record storage area, and if the record used for identifying the mapping relationship between the first user and the first video channel is not found in the mapping record storage area, determining that the first video channel corresponding to the first user is not found through the querying successfully, or if the record used for identifying the mapping relationship between the first user and the first video channel is found in the mapping record storage area, determining that the first video channel corresponding to the first user is found through the querying successfully.

103: If the first video channel corresponding to the first user is not found successfully through the querying, the video server attempts to allocate a second video channel that is currently already timed out to the first user, and if the second video channel that is currently already timed out is allocated to the first user successfully, writes the first video data to the second video channel, and tags that the second video channel belongs to the first user.

In some embodiments of the present invention, a video channel that is timed out may refer to that a time denoted by a time stamp corresponding to the video channel lags behind a current time by over a first time length threshold, where the first time length threshold may be, for example, one second, two seconds, three seconds or another time length that is set according to an actual need. The video channel that is timed out belongs to a specific user (e.g., a second user).

In some embodiments of the present invention, if the first video data is written to the second video channel, a time stamp of the second video channel may be further updated. It can be understood that, a time denoted by the updated time stamp of the second video channel is a time at which the first video data is written to the second video channel.

In some embodiments of the present invention, the video server may further generate a second record used for identifying a mapping relationship between the first user and the second video channel, perform calculation based on the multiple-Hash algorithm to obtain a second storage address, and write the second record to second storage space to which the second storage address points, where the second storage space belongs to the mapping record storage area.

In some embodiments of the present invention, an input of the foregoing multiple-Hash algorithm is, for example, user code of the first user (where the user code is several digits), where the user code of the first user is the user identifier of the first user or is obtained by means of conversion based on the user identifier of the first user.

In some embodiments of the present invention, $K \geq N*M*P$, where K denotes the size of total storage space of the foregoing mapping record storage area, M denotes a total quantity of video channels that the foregoing video server can provide, P denotes the size of storage space occupied by storage of a record used for identifying a mapping relationship between a user and a video channel, and N is a positive integer. For example, N may be equal to, for example, 1, 2, 3, 4, 5, 6 or another value.

For example, assuming that P=10 bytes, M is equal to 100, and N is equal to 6, K may be greater than or equal to 6000 bytes. Because addressing space of the mapping record storage area is greater than or equal to the total quantity of the video channels that the video server can provide, it helps allocate as fully as possible the video channels that the video server can provide, and also facilitates improvement in video channel utilization.

For example, the mapping record storage area may include at least N mapping record storage sub-areas, and the size of storage space of each mapping record storage sub-area is greater than or equal to M*P, where M denotes a total quantity of video channels that the foregoing video server can provide, and P denotes the size of storage space occupied by storage of a record used for identifying a mapping relationship between a user and a video channel. However, in this scenario, each single-Hash algorithm in the multiple-Hash algorithm may correspond to different mapping record storage sub-areas, and denominators of the single-Hash algorithms are different, and may be prime numbers less than M.

In some embodiments of the present invention, if the first video channel corresponding to the first user is found through the querying successfully, the video server may write the first video data to the first video channel.

In some embodiments of the present invention, if the first video data is written to the first video channel, a time stamp of the first video channel may be further updated. It can be understood that, a time denoted by the updated time stamp of the first video channel is a time at which the first video data is written to the first video channel.

In some embodiments of the present invention, the video channel management method may further include: if the second video channel that is currently already timed out is not allocated to the first user successfully, attempting to allocate a third video channel to the first user, the third video channel being a channel that is currently idle, and if the third video channel that is currently idle is allocated to the first user successfully, writing the first video data to the third video channel, and tagging that the third video channel belongs to the first user (for example, writing a user identifier of the first user to the third video channel). Moreover, if the third video channel that is currently idle is not allocated to the first user successfully (currently, there may be no idle video channel), it may be prompted that the first user acquires a video channel unsuccessfully (for example, a prompt message used for prompting that a video channel is acquired unsuccessfully may be sent to the first user terminal).

In some other embodiments of the present invention, before the attempting to allocate a second video channel that is currently already timed out to the first user, the method may further include: if the first video channel corresponding to the first user is not found successfully through the querying, attempting to allocate a third video channel that is currently idle to the first user, and if the third video channel that is currently idle is allocated to the first user successfully, writing the first video data to the third video channel, and tagging that the third video channel belongs to the first user; and if the third video channel that is currently idle fails to be allocated to the first user successfully, performing the step of attempting to allocate a second video channel that is currently already timed out to the first user, and if the second video channel that is currently already timed out is allocated to the first user successfully, writing the first video data to the second video channel, and tagging that the second video channel belongs to the first user. Moreover, if the second video channel that is currently already timed out is not allocated to the first user successfully (currently, there may be no video channel that currently already times out), it may be prompted that the first user acquires a video channel unsuccessfully (for example, a prompt message used for prompting that a video channel is acquired unsuccessfully may be sent to the first user terminal).

In some embodiments of the present invention, if the third video channel that is currently idle is allocated to the first user successfully, the video server may further generate a third record used for identifying a mapping relationship between the first user and the third video channel, perform calculation based on the multiple-Hash algorithm to obtain a third storage address, and write the third record to third storage space to which the third storage address points, where the third storage space belongs to the mapping record storage area.

In some embodiments of the present invention, if the first video data is written to the third video channel, a time stamp of the third video channel may be further updated. It can be understood that, a time denoted by the updated time stamp of the third video channel is a time at which the first video data is written to the third video channel.

It can be understood that, in some embodiments of the present invention, when a piece of video data (such as the first video data) is written to a video channel, a time stamp of the video channel may be further updated, and a time denoted by the updated time stamp of the video channel is a time at which the video data is written to the video channel.

In some embodiments of the present invention, the video channel management method may further include: resetting, when a channel resetting condition is satisfied, some or all video channels that are currently already timed out to idle video channels.

In some embodiments of the present invention, the channel resetting condition may be various feasible conditions that are set according to actual scenario needs. For example, the channel resetting condition may include at least one of the following conditions: a quantity of video channels that are currently idle is less than a first threshold (such as 10 or another value), a proportion of a quantity of video channels that are currently idle to a total channel quantity is less than a second threshold (such as 15% or another value), a timeout video channel resetting instruction is received, a quantity of video channels that are currently already timed out is greater than a third threshold (such as 20 or another value), a set resetting period (such as 1 minute, two minutes or another value) arrives, a proportion of a quantity of video channels that are currently already timed out to a total channel quantity is greater than a fourth threshold (such as 50% or another value), and a ratio of a quantity of video channels that are currently already timed out to a quantity of video channels that are currently idle is greater than a fifth threshold (such as 100% or another value).

Values of the thresholds (such as the first threshold, the second threshold, the third threshold, the fourth threshold and the fifth threshold) of this embodiment of the present invention may be set according to specific scenario needs, as long as the values can satisfy actual needs.

It can be understood that, when the set channel resetting condition is satisfied, some or all video channels that are currently already timed out are reset to idle video channels, and therefore based on this mechanism, the video server may obtain idle video channels in batches, which lays a foundation for subsequent improvement in video channel utilization efficiency.

In some embodiments of the present invention, the resetting, when a channel resetting condition is satisfied, some or all video channels that are currently already timed out to idle video channels may include: resetting, when a quantity of video channels that are currently idle is less than a first threshold, the some or all video channels that are currently already timed out to idle video channels; or resetting, when a proportion of a quantity of video channels that are currently idle to a total channel quantity is less than a second threshold, the some or all video channels that are currently already timed out to idle video channels; or resetting, when a timeout video channel resetting instruction is received, the some or all video channels that are currently already timed out to idle video channels; or resetting, when a set resetting period arrives, the some or all video channels that are currently already timed out to idle video channels; or resetting, when a quantity of video channels that are currently already timed out is greater than a third threshold, the some or all video channels that are currently already timed out to idle video channels; or resetting, when a proportion of a quantity of video channels that are currently already timed out to a total channel quantity is greater than a fourth threshold, the some or all video channels that are currently already timed out to idle video channels; or resetting, when a ratio of a quantity of video channels that are currently already timed out to a quantity of video channels that are currently idle is greater than a fifth threshold, the some or all video channels that are currently already timed out to idle video channels.

It can be seen from above that, in the solution of this embodiment, after receiving first video data, a video server first queries a first video channel corresponding to a first user to which the first video data belongs; and if the first video channel corresponding to the first user is found through the querying successfully, writes the first video data to the first video channel; or if the first video channel corresponding to the first user is not found successfully through the querying, attempts to allocate a second video channel that is currently already timed out to the first user, and if the second video channel that is currently already timed out is allocated to the first user successfully, writes the first video data to the second video channel, and tags that the second video channel belongs to the first user. A video channel time management mechanism is introduced, and a video channel that is currently already timed out may be allocated again to and used by another user, so that at different moments, a same video channel may be allocated repetitively to and used by multiple different users, which greatly improves video channel utilization efficiency, and then may reduce hardware resource deployment as much as possible. Moreover, based on this mechanism, a video channel does not need to be fixedly allocated to each user. Therefore, a conventional video channel allocation mechanism may be abandoned, and the disclosed video allocation management method can facilitate great increase in a quantity of access users allowed by the video server.

For convenience of better understanding and implementing the foregoing aspect of the embodiments of the present invention, further description is performed below by exemplifying several application scenarios.

Figure 2:
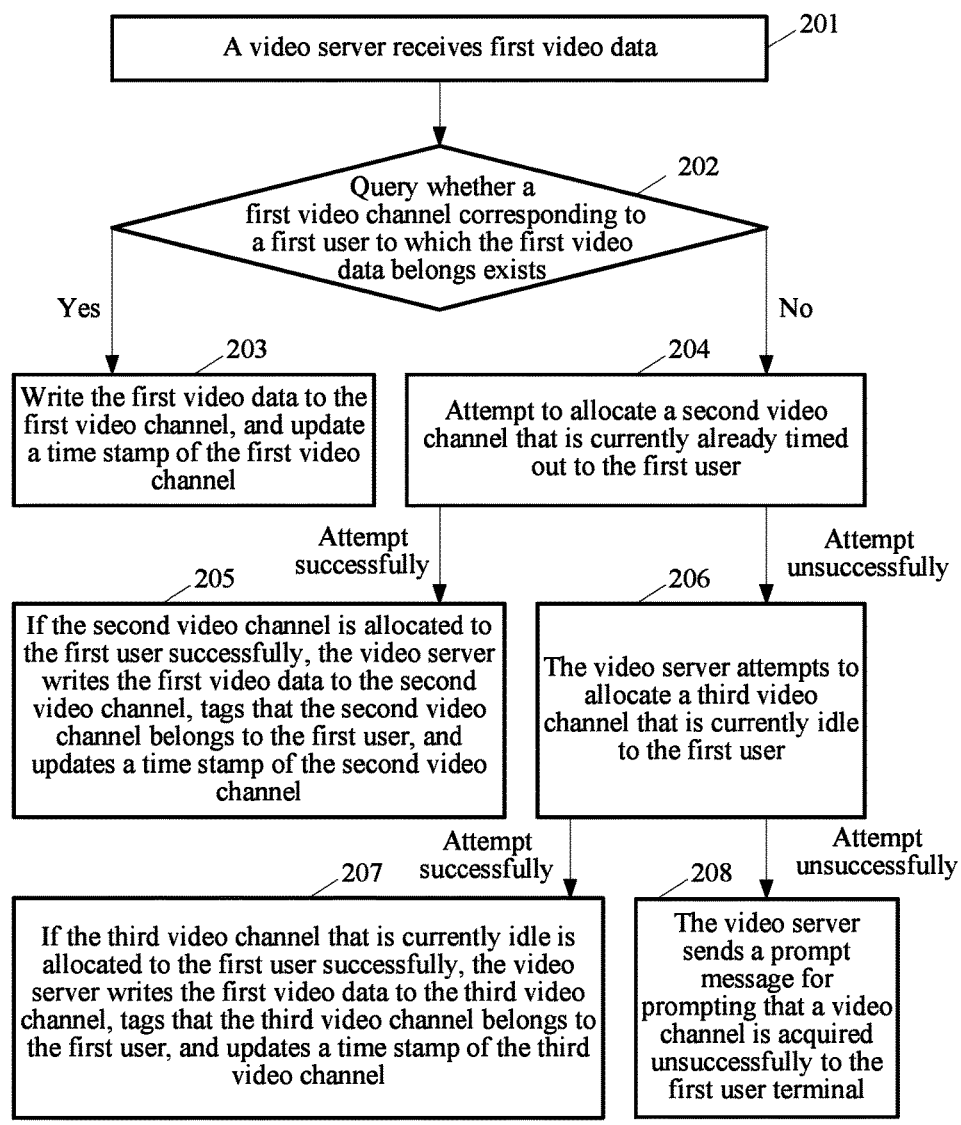
FIG. 2 is a schematic flowchart of another video channel allocation management method according to an embodiment of the present invention.

Referring to FIG. 2, FIG. 2 is a schematic flowchart of another video channel allocation management method according to an embodiment of the present invention. As shown in FIG. 2, the another video channel allocation management method provided in this embodiment of the present invention may include the following contents.

201: A video server receives first video data from a first user terminal.

For example, after a user terminal (which may be referred to as a first user terminal for convenience of quotation) establishes a connection to a video server, the first user terminal may send a piece of video data (which is referred to as first video data for convenience of quotation) to the video server, and the video server may receive the first video data from the first user terminal. The first user terminal sending the first video data belongs to a user (which may be referred to as a first user). The first video data may be live video data, and certainly may also be another type of video data packet.

202: The video server queries whether a first video channel corresponding to a first user to which the first video data belongs exists. When the first video channel corresponding to the first user exist, step 203 is performed; or when the first video channel corresponding to the first user does not exist, step 204 is performed.

203: If the first video channel corresponding to the first user is found through the querying successfully, the video server writes the first video data to the first video channel, and updates a time stamp of the first video channel.

It can be understood that, a time denoted by the updated time stamp of the first video channel is a time at which the first video data is written to the first video channel.

204: If the first video channel corresponding to the first user is not found through the querying successfully, the video server attempts to allocate a second video channel that is currently already timed out to the first user. If the video server attempts to allocate the second video channel that is currently already timed out to the first user successfully (if a video channel that is timed out exists currently, the video server may attempt to allocate the second video channel that is currently already timed out to the first user successfully), step 205 is performed; or if the video server attempts to allocate the second video channel that is currently already timed out to the first user unsuccessfully (if a video channel that is timed out does not exist currently, the video server attempts to allocate the second video channel that is currently already timed out to the first user unsuccessfully), step 206 is performed.

205: If the second video channel that is currently already timed out is allocated to the first user successfully, the video server writes the first video data to the second video channel, tags that the second video channel belongs to the first user, and updates a time stamp of the second video channel.

206: If the second video channel that is currently already timed out is not allocated to the first user successfully, the video server attempts to allocate a third video channel that is currently idle to the first user. If the video server attempts to allocate the third video channel that is currently idle to the first user successfully (if an idle video channel exists currently, the video server may attempt to allocate the third video channel that is currently idle to the first user successfully), step 207 is performed; or if the video server attempts to allocate the third video channel that is currently idle to the first user unsuccessfully (if an idle video channel does not exist currently, the video server attempts to allocate the third video channel that is currently idle to the first user unsuccessfully), step 208 is performed.

207: If the third video channel that is currently idle is allocated to the first user successfully, the video server writes the first video data to the third video channel, tags that the third video channel belongs to the first user, and updates a time stamp of the third video channel.

208: If the third video channel that is currently idle is not allocated to the first user successfully, the video server sends a prompt message used for prompting that a video channel is acquired unsuccessfully to the first user terminal.

It can be seen from above that, in the solution of this embodiment, after receiving first video data, a video server first queries a first video channel corresponding to a first user to which the first video data belongs; and if the first video channel corresponding to the first user is found through the querying successfully, writes the first video data to the first video channel; or if the first video channel corresponding to the first user is not found successfully through the querying, attempts to allocate a second video channel that is currently already timed out to the first user, and if the second video channel that is currently already timed out is allocated to the first user successfully, writes the first video data to the second video channel, and tags that the second video channel belongs to the first user; and if the second video channel that is currently already timed out is not allocated to the first user successfully, the video server attempts to allocate a third video channel that is currently idle to the first user. A video channel time management mechanism based on a time stamp is introduced, and a video channel that is currently already timed out may be allocated again to and used by another user, so that a same video channel may be allocated repetitively to and used by multiple different users, which greatly improves video channel utilization efficiency, and then may reduce hardware resource deployment as much as possible. Moreover, based on this mechanism, a video channel does not need to be fixedly allocated to each user, and therefore, a conventional video channel allocation mechanism may be abandoned, and the disclosed method and system can facilitates great increase in a quantity of access users allowed by the video server.

Figure 3:
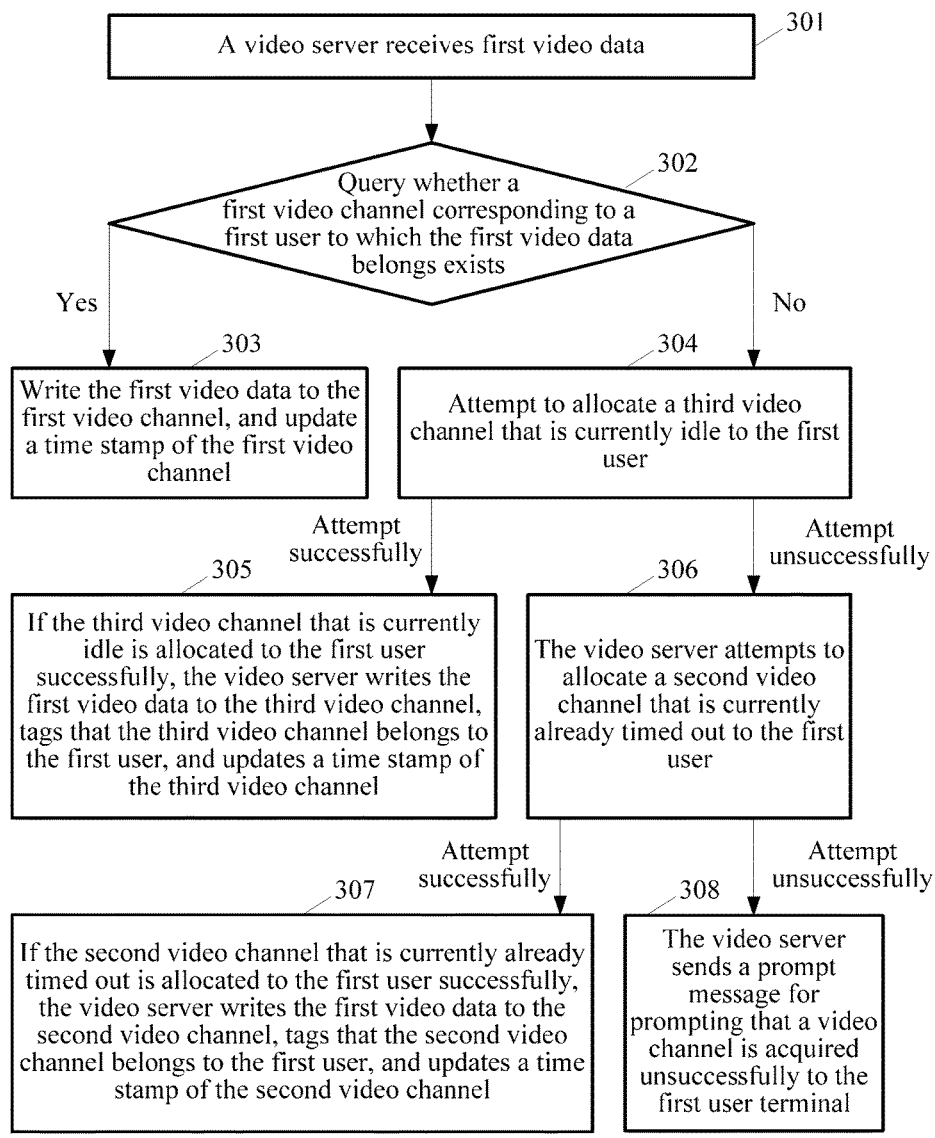
FIG. 3 is a schematic flowchart of another video channel allocation management method according to an embodiment of the present invention.

Referring to FIG. 3, FIG. 3 is a schematic flowchart of another video channel allocation management method according to an embodiment of the present invention. As shown in FIG. 3, the another video channel allocation management method provided in this embodiment of the present invention may include the following contents.

301: A video server receives first video data from a first user terminal.

302: The video server queries whether a first video channel corresponding to a first user to which the first video data belongs exists. When the first video channel corresponding to the first user exist, step 303 is performed; or when the first video channel corresponding to the first user does not exist, step 304 is performed.

303: If the first video channel corresponding to the first user is found through the querying successfully, the video server writes the first video data to the first video channel, and updates a time stamp of the first video channel.

304: If the first video channel corresponding to the first user is not found through the querying successfully, the video server attempts to allocate a third video channel that is currently idle to the first user. If the video server attempts to allocate the third video channel that is currently idle to the first user successfully, step 305 is performed; or if the video server attempts to allocate the third video channel that is currently idle to the first user unsuccessfully, step 306 is performed.

305: If the third video channel that is currently idle is allocated to the first user successfully, the video server writes the first video data to the third video channel, tags that the third video channel belongs to the first user, and updates a time stamp of the third video channel.

306: If the third video channel that is currently idle is not allocated to the first user successfully, the video server attempts to allocate a second video channel that is currently already timed out to the first user. If the video server attempts to allocate the second video channel that is currently already timed out to the first user successfully, step 307 is performed; or if the video server attempts to allocate the second video channel that is currently already timed out to the first user unsuccessfully, step 308 is performed.

307: If the second video channel that is currently already timed out is allocated to the first user successfully, the video server writes the first video data to the second video channel, tags that the second video channel belongs to the first user, and updates a time stamp of the second video channel.

308: If the second video channel that is currently already timed out is not allocated to the first user successfully, the video server sends a prompt message used for prompting that a video channel is acquired unsuccessfully to the first user terminal.

It can be seen from above that, in the solution of this embodiment, after receiving first video data, a video server first queries a first video channel corresponding to a first user to which the first video data belongs; and if the first video channel corresponding to the first user is found through the querying successfully, writes the first video data to the first video channel; or if the video channel corresponding to the first user is not found through the querying successfully, attempts to allocate a third video channel that is currently idle to the first user; and if the third video channel that is currently idle is not allocated to the first user successfully, attempts to allocate a second video channel that is currently already timed out to the first user, and if the second video channel that is currently already timed out is allocated to the first user successfully, writes the first video data to the second video channel, and tags that the second video channel belongs to the first user. A video channel time management mechanism based on a time stamp is introduced, and a video channel that is currently already timed out may be allocated again to and used by another user, so that at different moments, a same video channel may be allocated repetitively to and used by multiple different users, which greatly improves video channel utilization efficiency, and then may reduce hardware resource deployment as much as possible. Moreover, based on this mechanism, a video channel does not need to be fixedly allocated to each user, and therefore, a conventional video channel allocation mechanism may be abandoned, and the disclosed method and system can facilitates great increase in a quantity of access users allowed by the video server.

For convenience of better understanding and implementing the foregoing aspect of the embodiments of the present invention, further description is performed below by exemplifying a more specific application scenario.

In Example 1 and Example 2, it is assumed that the video server may provide at most 100 video channels. It is assumed that a user terminal a used by a user A establishes a connection to a video server.

Example 1

It is assumed that the video server receives video data s1 from the user terminal a, where the video data s1 carries a user identifier of the user A; the video server queries, based on the user identifier of the user A, whether a first video channel corresponding to the user A to which the video data s1 belongs exists; if the first video channel corresponding to the user A is found through the querying successfully, the video server may write the video data s1 to the first video channel, and update a time stamp of the first video channel; or if the first video channel corresponding to the user A is not found through the querying successfully, the video server attempts to allocate a second video channel that is currently already timed out to the user A; if the second video channel that is currently already timed out is allocated to the user A successfully, the video server writes the video data s1 to the second video channel, tags that the second video channel belongs to the user A, and updates a time stamp of the second video channel; or if the second video channel that is currently already timed out is not allocated to the user A successfully, the video server may attempt to allocate a third video channel that is currently idle to the user A; and if the third video channel that is currently idle is allocated to the user A successfully, the video server writes the video data s1 to the third video channel, tags that the third video channel belongs to the user A, and updates a time stamp of the third video channel; or if the third video channel that is currently idle is not allocated to the user A successfully, the video server may send a prompt message to the user terminal a indicating that acquiring a video channel is failed.

Example 2

It is assumed that the video server receives video data s1 from the user terminal a, where the video data s1 carries a user identifier of the user A; the video server queries, based on the user identifier of the user A, whether a first video channel corresponding to the user A to which the video data s1 belongs exists; if the first video channel corresponding to the user A is found through the querying successfully, the video server may write the video data s1 to the first video channel, and update a time stamp of the first video channel; or if the first video channel corresponding to the user A is not found through the querying successfully, the video server attempts to allocate a third video channel that is currently idle to the user A; if the third video channel that is currently idle is allocated to the user A successfully, the video server writes the video data s1 to the third video channel, tags that the third video channel belongs to the user A, and updates a time stamp of the third video channel; or if the third video channel that is currently idle is not allocated to the user A successfully, the video server may attempt to allocate a second video channel that is currently already timed out to the user A; and if the second video channel that is currently already timed out is allocated to the user A successfully, the video server writes the video data s1 to the second video channel, tags that the second video channel belongs to the user A, and updates a time stamp of the second video channel; or if the second video channel that is currently already timed out is not allocated to the user A successfully, the video server may send a prompt message used for prompting that a video channel is acquired unsuccessfully to the user terminal a.

It can be seen that, based on the mechanism of this embodiment of the present invention, it becomes possible that one video server may accommodate thousands of users. Indefinite number of users may be added to one video server theoretically. Further, holding a large conference by using one video server may be implemented.

For convenience of better implementing the foregoing solutions of the embodiments of the present invention, a related apparatus for implementing the foregoing solutions is further provided below.

Figure 4A:
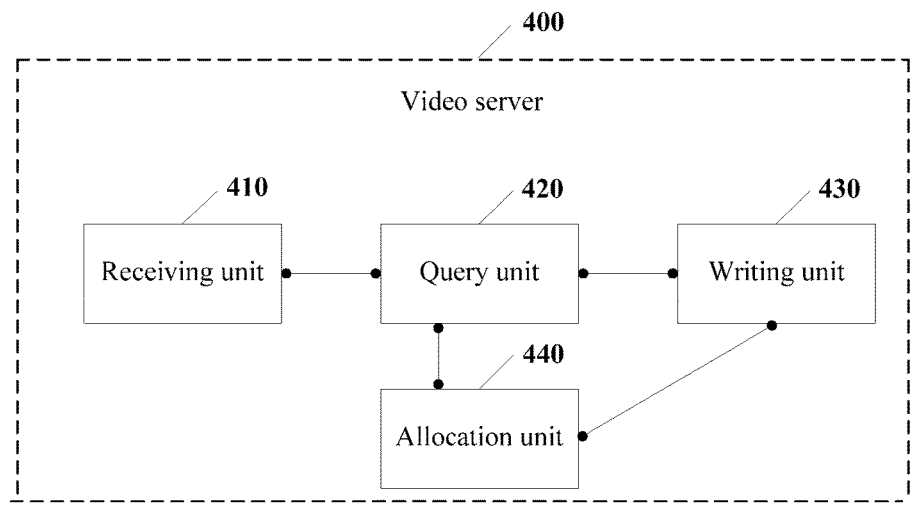
FIG. 4a is a schematic diagram of a video server according to an embodiment of the present invention.

Referring to FIG. 4a, an embodiment of the present invention provides a video server 400 that may include: a receiving unit 410, a query unit 420, a writing unit 430 and an allocation unit 440.

The receiving unit 410 is configured to receive first video data.

In some embodiments of the present invention, the first video data may further include, for example, a user identifier of the first user.

The query unit 420 is configured to query a first video channel corresponding to a first user to which the first video data belongs.

In some embodiments of the present invention, before the receiving unit 410 receives the first video data, the allocation unit 440 may already allocate a video channel to the first user, or may not yet allocate a video channel to the first user, where the allocation unit 440 may not allocate a video channel to the first user previously, or the allocation unit 440 may allocate a video channel previously allocated to the first user to another user, or the video server may reset a video channel previously allocated to the first user to an idle video channel, where the idle video channel does not belong to any user.

The allocation unit 440 is configured to: if the query unit 420 does not find the first video channel corresponding to the first user through the querying successfully, attempt to allocate a second video channel that is currently already timed out to the first user.

The writing unit 430 is configured to: if the allocation unit 440 allocates the second video channel that is currently already timed out to the first user successfully, write the first video data to the second video channel, and tag that the second video channel belongs to the first user.

In some embodiments of the present invention, the writing unit 430 is further configured to: if the query unit 420 finds the first video channel corresponding to the first user through the querying successfully, write the first video data to the first video channel.

In some embodiments of the present invention, a video channel that is timed out may refer to that a time denoted by a time stamp corresponding to the video channel lags behind a current time by over a first time length threshold, where the first time length threshold may be, for example, one second, two seconds, three seconds or another time length that is set according to an actual need. The video channel that is timed out belongs to a user.

In some embodiments of the present invention, the allocation unit 440 is further configured to: if the second video channel that is currently already timed out is not allocated to the first user successfully, attempt to allocate a third video channel that is currently idle to the first user; and the writing unit 430 is further configured to: if the third video channel that is currently idle is allocated to the first user successfully, write the first video data to the third video channel, and tag that the third video channel belongs to the first user.

In some other embodiments of the present invention, the allocation unit 440 is specifically configured to: if the query unit 420 does not find the video channel corresponding to the first user through the querying successfully, attempt to allocate a video channel that is currently idle to the first user; and if the video channel that is currently idle fails to be allocated to the first user successfully, attempt to allocate a video channel that is currently already timed out to the first user.

The writing unit 430 is further configured to: if the allocation unit 440 allocates the third video channel that is currently idle to the first user successfully, write the first video data to the third video channel, and tag that the third video channel belongs to the first user.

In some embodiments of the present invention, the query unit 420 may be specifically configured to: search, based on a multiple-Hash algorithm (or a traversal algorithm or another algorithm), for whether a record used for identifying a mapping relationship between the first user and the first video channel is stored in a mapping record storage area, and if the record used for identifying the mapping relationship between the first user and the first video channel is not found in the mapping record storage area, determine that the first video channel corresponding to the first user is not found through the querying successfully, or if the record used for identifying the mapping relationship between the first user and the first video channel is found in the mapping record storage area, determine that the first video channel corresponding to the first user is found through the querying successfully.

In some embodiments of the present invention, an input of the foregoing multiple-Hash algorithm is, for example, user code of the first user (where the user code is several digits), where the user code of the first user is the user identifier of the first user or is obtained by means of conversion based on the user identifier of the first user.

Figure 4B:
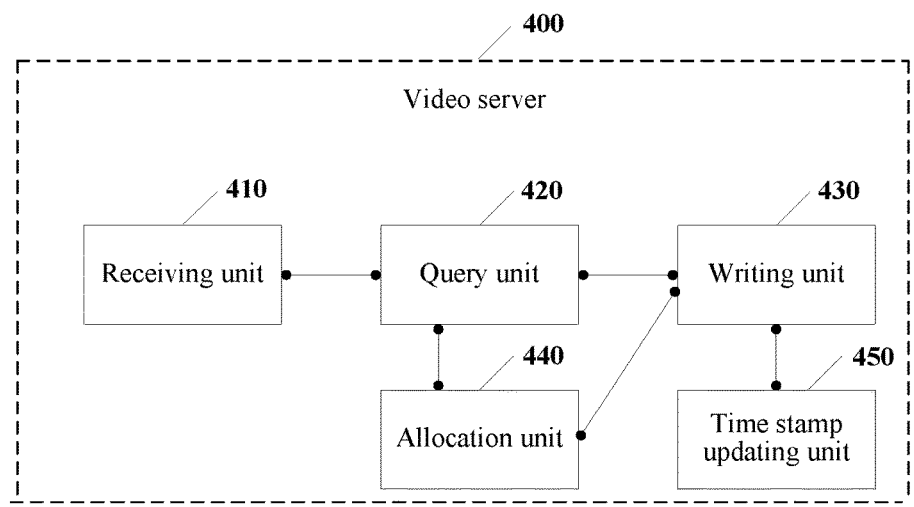
FIG. 4b is a schematic diagram of another video server according to an embodiment of the present invention.

Referring to FIG. 4*b*, in some embodiments of the present invention, the video server 400 may further include: a time stamp updating unit 450, configured to: if the writing unit 430 writes the first video data to the first video channel, update a time stamp of the first video channel; or if the writing unit 430 writes the first video data to the second video channel, update a time stamp of the second video channel; or if the writing unit 430 writes the first video data to the third video channel, update a time stamp of the third video channel.

Figure 4C:
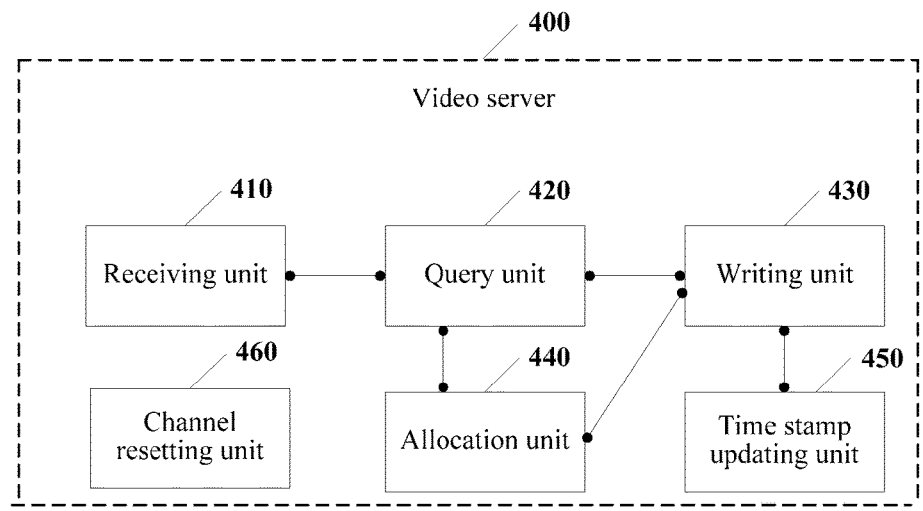
FIG. 4c is a schematic diagram of another video server according to an embodiment of the present invention.

Referring to FIG. 4*c*, in some embodiments of the present invention, the video server 400 may further include: a channel resetting unit 460, configured to reset, when a channel resetting condition is satisfied, some or all video channels that are currently already timed out to idle video channels.

In some embodiments of the present invention, the channel resetting condition may be various feasible conditions that are set according to actual scenario needs. For example, the channel resetting condition may include at least one of the following conditions: a quantity of video channels that are currently idle is less than a first threshold (such as 10 or another value), a proportion of a quantity of video channels that are currently idle to a total channel quantity is less than a second threshold (such as 15% or another value), a timeout video channel resetting instruction is received, a quantity of video channels that are currently already timed out is greater than a third threshold (such as 20 or another value), a set resetting period (such as 1 minute, two minutes or another value) arrives, a proportion of a quantity of video channels that are currently already timed out to a total channel quantity is greater than a fourth threshold (such as 50% or another value), and a ratio of a quantity of video channels that are currently already timed out to a quantity of video channels that are currently idle is greater than a fifth threshold (such as 100% or another value).

In some embodiments of the present invention, the channel resetting unit 460 may be specifically configured to reset, when a quantity of video channels that are currently idle is less than a first threshold, the some or all video channels that are currently already timed out to idle video channels; or reset, when a proportion of a quantity of video channels that are currently idle to a total channel quantity is less than a second threshold, the some or all video channels that are currently already timed out to idle video channels; or reset, when a timeout video channel resetting instruction is received, the some or all video channels that are currently already timed out to idle video channels; or reset, when a set resetting period arrives, the some or all video channels that are currently already timed out to idle video channels; or reset, when a quantity of video channels that are currently already timed out is greater than a third threshold, the some or all video channels that are currently already timed out to idle video channels; or reset, when a proportion of a quantity of video channels that are currently already timed out to a total channel quantity is greater than a fourth threshold, the some or all video channels that are currently already timed out to idle video channels; or reset, when a ratio of a quantity of video channels that are currently already timed out to a quantity of video channels that are currently idle is greater than a fifth threshold, the some or all video channels that are currently already timed out to idle video channels.

It can be understood that functions of functional modules of the video server 400 in this embodiment can be specifically implemented according to the method in the foregoing method embodiments, and reference may be made to a related description of the foregoing method embodiments for a specific implementation process thereof, which is not described herein in detail.

It can be seen from above that, in the solution of this embodiment, after receiving first video data, a video server 400 first queries a first video channel corresponding to a first user to which the first video data belongs; and if the first video channel corresponding to the first user is found through the querying successfully, writes the first video data to the first video channel; or if the first video channel corresponding to the first user is not found successfully through the querying, attempts to allocate a second video channel that is currently already timed out to the first user, and if the second video channel that is currently already timed out is allocated to the first user successfully, writes the first video data to the second video channel, and tags that the second video channel belongs to the first user. A video channel time management mechanism is introduced, and a video channel that is currently already timed out may be allocated again to and used by another user, so that at different moments, a same video channel may be allocated repetitively to and used by multiple different users, which greatly improves video channel utilization efficiency, and then may reduce hardware resource deployment as much as possible. Moreover, based on this mechanism, a video channel does not need to be fixedly allocated to each user, and therefore, a conventional video channel allocation mechanism may be abandoned, and the disclosed method and system can facilitates great increase in a quantity of access users allowed by the video server.

Figure 5:
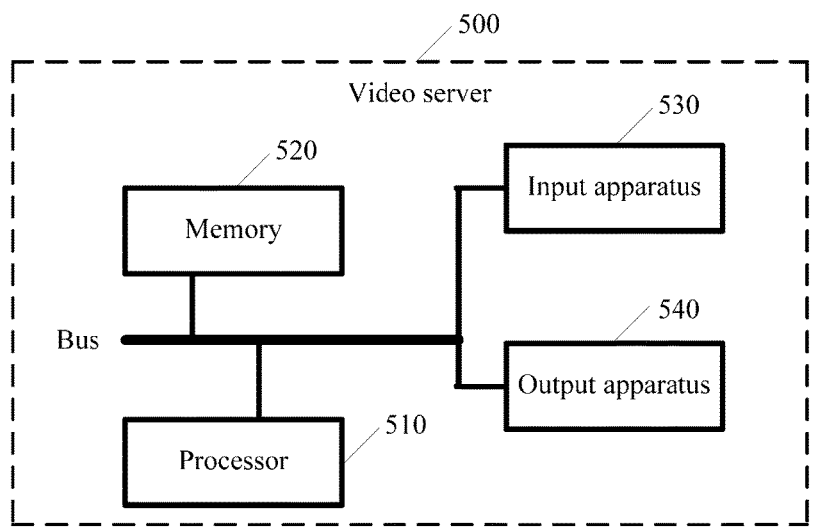
FIG. 5 is a schematic diagram of another video server according to an embodiment of the present invention.

Referring to FIG. 5, an embodiment of the present invention provides a video server 500 that may include: a processor 510, a memory 520, an input apparatus 530 and an output apparatus 540. There may be one or more processors 510 in the video server 500, and in FIG. 5, one processor is used as an example. In some embodiments of the present invention, the processor 510, the memory 520, the input apparatus 530 and the output apparatus 540 may be connected by using a bus or in another manner. In FIG. 5, as an example, the processor 510, the memory 520, the input apparatus 530 and the output apparatus 540 are connected using a bus.

The memory 520 may be configured to store a software program and module. The processor 510 runs the software program and module stored in the memory 520, to implement various functional applications and data processing of the video server 500. The memory 520 may mainly include a program storage area and a data storage area. The program storage area may store an operating system, an application program required by at least one function (such as a sound playback function and an image display function), and the like. The data storage area may store data (such as audio data and an address book) created according to use of the user terminal, and the like. In addition, the memory 520 may include a high speed random access memory, and may also include a non-volatile memory, such as at least one magnetic disk storage device, a flash memory, or another volatile solid storage device. The input apparatus 530 may be configured to receive input digit or character information, and generate key signal input related to the user setting and function control of the video server 500.

The processor 510 performs the following steps: receiving first video data; querying a first video channel corresponding to a first user to which the first video data belongs; and if the first video channel corresponding to the first user is not found successfully through the querying, attempting to allocate a second video channel that is currently already timed out to the first user, and if the second video channel that is currently already timed out is allocated to the first user successfully, writing the first video data to the second video channel, and tagging that the second video channel belongs to the first user.

In some embodiments of the present invention, if the first video channel corresponding to the first user is found through the querying successfully, the processor 510 may write the first video data to the first video channel.

For example, after a user terminal (which may be referred to as a first user terminal for convenience of quotation) establishes a connection to a video server, the first user terminal may send a piece of video data (which is referred to as first video data for convenience of quotation) to the video server, and the video server may receive the first video data from the first user terminal. The first user terminal sending the first video data belongs to a user (which may be referred to as a first user). The first video data may be live video data, and certainly may also be another type of video data packet.

In some embodiments of the present invention, the first video data may further include, for example, a user identifier of the first user.

In some embodiments of the present invention, before receiving the first video data, the processor 510 may have already allocated a video channel to the first user, or may not yet allocate a video channel to the first user (the video server may not allocate a video channel to the first user previously, or the processor 510 may allocate a video channel previously allocated to the first user to another user, or the processor 510 may reset a video channel previously allocated to the first user to an idle video channel, where the idle video channel does not belong to any user).

A video channel is a storage resource (such as a memory resource), in a video server, that is used for storing video data, and information such as a time stamp, and a user identifier of a user to which the video channel currently belongs may be recorded in the video channel.

In some embodiments of the present invention, if the first video data is written to the first video channel, a time stamp of the first video channel may be further updated. It can be understood that, a time denoted by the updated time stamp of the first video channel is a time at which the first video data is written to the first video channel.

In some embodiments of the present invention, a video channel that is timed out may refer to that a time denoted by a time stamp corresponding to the video channel lags behind a current time by over a first time length threshold, where the first time length threshold may be, for example, one second, two seconds, three seconds or another time length that is set according to an actual need. The video channel that is timed out belongs to a user.

In some embodiments of the present invention, if the first video data is written to the second video channel, a time stamp of the second video channel may be further updated. It can be understood that, a time denoted by the updated time stamp of the second video channel is a time at which the first video data is written to the second video channel.

In some embodiments of the present invention, if the second video channel that is currently already timed out is not allocated to the first user successfully, the processor 510 may attempt to allocate a third video channel that is currently idle to the first user, and if the third video channel that is currently idle is allocated to the first user successfully, write the first video data to the third video channel, and tag that the third video channel belongs to the first user (for example, write a user identifier of the first user to the third video channel). Moreover, if the third video channel that is currently idle is not allocated to the first user successfully (currently, there may be no idle video channel), it may be prompted that the first user acquires a video channel unsuccessfully (for example, a prompt message used for prompting that a video channel is acquired unsuccessfully may be sent to the first user terminal).

In some other embodiments of the present invention, before the attempting to allocate a second video channel that is currently already timed out to the first user, if the first video channel corresponding to the first user is not found through the querying successfully, the processor 510 attempts to allocate a third video channel that is currently idle to the first user, and if the third video channel that is currently idle is allocated to the first user successfully, writes the first video data to the third video channel, and tags that the third video channel belongs to the first user; or if the third video channel that is currently idle fails to be allocated to the first user successfully, the processor 510 then attempts to allocate a second video channel that is currently already timed out to the first user, and if the second video channel that is currently already timed out is allocated to the first user successfully, writes the first video data to the second video channel, and tags that the second video channel belongs to the first user. Moreover, if the second video channel that is currently already timed out is not allocated to the first user successfully (currently, there may be no video channel that currently already times out), the processor 510 may prompt that the first user acquires a video channel unsuccessfully (for example, a prompt message used for prompting that a video channel is acquired unsuccessfully may be sent to the first user terminal).

In some embodiments of the present invention, if the first video data is written to the third video channel, a time stamp of the third video channel may be further updated. It can be understood that, a time denoted by the updated time stamp of the third video channel is a time at which the first video data is written to the third video channel.

It can be understood that, in some embodiments of the present invention, when a piece of video data (such as the first video data) is written to a video channel, a time stamp of the video channel may be further updated, and a time denoted by the updated time stamp of the video channel is a time at which the video data is written to the video channel.

In some embodiments of the present invention, the querying, by the processor 510, a first video channel corresponding to a first user to which the first video data belongs may include: searching, based on a multiple-Hash algorithm (or a traversal algorithm or another algorithm), for whether a record used for identifying a mapping relationship between the first user and the first video channel is stored in a mapping record storage area, and if the record used for identifying the mapping relationship between the first user and the first video channel is not found in the mapping record storage area, determining that the first video channel corresponding to the first user is not found through the querying successfully, or if the record used for identifying the mapping relationship between the first user and the first video channel is found in the mapping record storage area, determining that the first video channel corresponding to the first user is found through the querying successfully.

In some embodiments of the present invention, the processor 510 may further generate a second record used for identifying a mapping relationship between the first user and the second video channel, perform calculation based on the multiple-Hash algorithm to obtain a second storage address, and write the second record to second storage space to which the second storage address points, where the second storage space belongs to the mapping record storage area.

In some embodiments of the present invention, an input of the foregoing multiple-Hash algorithm is, for example, user code of the first user (where the user code is several digits), where the user code of the first user is the user identifier of the first user or is obtained by means of conversion based on the user identifier of the first user.

In some embodiments of the present invention, $K \geq N*M*P$, where K denotes the size of total storage space of the foregoing mapping record storage area, M denotes a total quantity of video channels that the foregoing video server can provide, P denotes the size of storage space occupied by storage of a record used for identifying a mapping relationship between a user and a video channel, and N is a positive integer. For example, N may be equal to, for example, 1, 2, 3, 4, 5, 6 or another value.

For example, assuming that P=10 bytes, M is equal to 100, and N is equal to 6, K may be greater than or equal to 6000 bytes. Because addressing space of the mapping record storage area is greater than or equal to the total quantity of the video channels that the video server can provide, it helps allocate as fully as possible the video channels that the video server can provide, and also facilitates improvement in video channel utilization.

For example, the mapping record storage area may include at least N mapping record storage sub-areas, and the size of storage space of each mapping record storage sub-area is greater than or equal to $M*P$, where M denotes a total quantity of video channels that the foregoing video server can provide, and P denotes the size of storage space occupied by storage of a record used for identifying a mapping relationship between a user and a video channel. However, in this scenario, each single-Hash algorithm in the multiple-Hash algorithm may correspond to different mapping record storage sub-areas, and denominators of the single-Hash algorithms are different, and may be prime numbers less than M.

In some embodiments of the present invention, when a channel resetting condition is satisfied, the processor 510 may reset some or all video channels that are currently already timed out to idle video channels.

In some embodiments of the present invention, the channel resetting condition may be various feasible conditions that are set according to actual scenario needs. For example, the channel resetting condition may include at least one of the following conditions: a quantity of video channels that are currently idle is less than a first threshold (such as 10 or another value), a proportion of a quantity of video channels that are currently idle to a total channel quantity is less than a second threshold (such as 15% or another value), a timeout video channel resetting instruction is received, a quantity of video channels that are currently already timed out is greater than a third threshold (such as 20 or another value), a set resetting period (such as 1 minute, two minutes or another value) arrives, a proportion of a quantity of video channels that are currently already timed out to a total channel quantity is greater than a fourth threshold (such as 50% or another value), and a ratio of a quantity of video channels that are currently already timed out to a quantity of video channels that are currently idle is greater than a fifth threshold (such as 100% or another value).

It can be understood that, when the set channel resetting condition is satisfied, some or all video channels that are currently already timed out are reset to idle video channels, and therefore based on this mechanism, the video server may obtain idle video channels in batches, which lays a foundation for subsequent improvement in video channel utilization efficiency.

In some embodiments of the present invention, the resetting, by the processor 510, when a channel resetting condition is satisfied, some or all video channels that are currently already timed out to idle video channels may include: resetting, when a quantity of video channels that are currently idle is less than a first threshold, the some or all video channels that are currently already timed out to idle video channels; or resetting, when a proportion of a quantity of video channels that are currently idle to a total channel quantity is less than a second threshold, the some or all video channels that are currently already timed out to idle video channels; or resetting, when a timeout video channel resetting instruction is received, the some or all video channels that are currently already timed out to idle video channels; or resetting, when a set resetting period arrives, the some or all video channels that are currently already timed out to idle video channels; or resetting, when a quantity of video channels that are currently already timed out is greater than a third threshold, the some or all video channels that are currently already timed out to idle video channels; or resetting, when a proportion of a quantity of video channels that are currently already timed out to a total channel quantity is greater than a fourth threshold, the some or all video channels that are currently already timed out to idle video channels; or resetting, when a ratio of a quantity of video channels that are currently already timed out to a quantity of video channels that are currently idle is greater than a fifth threshold, the some or all video channels that are currently already timed out to idle video channels.

It can be seen from above that, in the solution of this embodiment, after receiving first video data, a video server 500 first queries a first video channel corresponding to a first user to which the first video data belongs; and if the first video channel corresponding to the first user is found through the querying successfully, writes the first video data to the first video channel; or if the first video channel corresponding to the first user is not found successfully through the querying, attempts to allocate a second video channel that is currently already timed out to the first user, and if the second video channel that is currently already timed out is allocated to the first user successfully, writes the first video data to the second video channel, and tags that the second video channel belongs to the first user. A video channel time management mechanism is introduced, and a video channel that is currently already timed out may be allocated again to and used by another user, so that at different moments, a same video channel may be allocated repetitively to and used by multiple different users, which greatly improves video channel utilization efficiency, and then may reduce hardware resource deployment as much as possible. Moreover, based on this mechanism, a video channel does not need to be fixedly allocated to each user, and therefore, a conventional video channel allocation mechanism may be abandoned, and the disclosed method and system can facilitates great increase in a quantity of access users allowed by the video server.

In some embodiments, the video server 500 may further facilitate multiple users to access video data from one or more video channels. For example, a first user may send the first video data to the video server 500. The video server 500 may successfully allocate a video channel to the first video data, updates the time stamp, and records information about the user identifier of the first user. A second user may query the video server 500 using the user identifier of the first user. Based on the user identifier, the video server 500 may find the video channel corresponding to the first user and send the first video data in the video channel allocated to the first user to the second user. Accordingly, the second user may receive and play the first video data.

Figure 6:
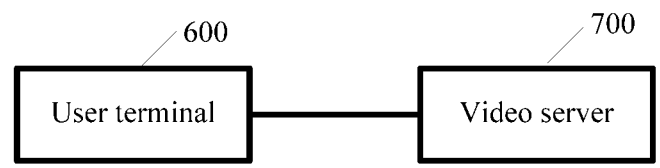
FIG. 6 is a schematic diagram of a communication system according to an embodiment of the present invention.

Referring to FIG. 6, an embodiment of the present invention further provides a communication system, including: a user terminal 600 and a video server 700, where the user terminal 600 is configured to send first video data to the video server 700; and the video server 700 is configured to receive the first video data from the user terminal 600; query a first video channel corresponding to a first user to which the first video data belongs; and if the first video channel corresponding to the first user is not found successfully through the querying, attempt to allocate a second video channel that is currently already timed out to the first user, and if the second video channel that is currently already timed out is allocated to the first user successfully, write the first video data to the second video channel, and tag that the second video channel belongs to the first user. In some embodiments, the video server 700 may have similar configurations as the video server 500.

In some embodiments of the present invention, the video server 700 may be further configured to: if the first video channel corresponding to the first user is found through the querying successfully, write the first video data to the first video channel.

In some embodiments of the present invention, before receiving the first video data, the video server 700 may already allocate a video channel to the first user, or may not yet allocate a video channel to the first user (the video server 700 may not allocate a video channel to the first user previously, or the video server 700 may allocate a video channel previously allocated to the first user to another user, or the video server 700 may reset a video channel previously allocated to the first user to an idle video channel).

In some embodiments of the present invention, if the first video data is written to the first video channel, the video server 700 may further update a time stamp of the first video channel. It can be understood that, a time denoted by the updated time stamp of the first video channel is a time at which the first video data is written to the first video channel.

In some embodiments of the present invention, a video channel that is timed out may refer to that a time denoted by a time stamp corresponding to the video channel lags behind a current time by over a first time length threshold, where the first time length threshold may be, for example, one second, two seconds, three seconds or another time length that is set according to an actual need. The video channel that is timed out belongs to a user.

In some embodiments of the present invention, if the first video data is written to the second video channel, the video server 700 may further update a time stamp of the second video channel. It can be understood that, a time denoted by the updated time stamp of the second video channel is a time at which the first video data is written to the second video channel.

In some embodiments of the present invention, if the second video channel that is currently already timed out is not allocated to the first user successfully, the video server 700 may attempt to allocate a third video channel that is currently idle to the first user, and if the third video channel that is currently idle is allocated to the first user successfully, write the first video data to the third video channel, and tag that the third video channel belongs to the first user (for example, write a user identifier of the first user to the third video channel). Moreover, if the third video channel that is currently idle is not allocated to the first user successfully (currently, there may be no idle video channel), it may be prompted that the first user acquires a video channel unsuccessfully (for example, a prompt message used for prompting that a video channel is acquired unsuccessfully may be sent to the first user terminal).

In some other embodiments of the present invention, before attempting to allocate a second video channel that is currently already timed out to the first user, if the first video channel corresponding to the first user is not found successfully through the querying, the video server 700 attempts to allocate a third video channel that is currently idle to the first user, and if the third video channel that is currently idle is allocated to the first user successfully, writes the first video data to the third video channel, and tags that the third video channel belongs to the first user; and if the third video channel that is currently idle fails to be allocated to the first user successfully, then attempts to allocate a second video channel that is currently already timed out to the first user, and if the second video channel that is currently already timed out to the first user is allocated to the first user successfully, writes the first video data to the second video channel, and tags that the second video channel belongs to the first user; and if the second video channel that is currently already timed out is not allocated to the first user successfully, may prompt that the first user acquires a video channel unsuccessfully.

In some embodiments of the present invention, if the first video data is written to the third video channel, the video server 700 may further update a time stamp of the third video channel. It can be understood that, a time denoted by the updated time stamp of the third video channel is a time at which the first video data is written to the third video channel.

In some embodiments of the present invention, when a channel resetting condition is satisfied, the video server 700 may further reset some or all video channels that are currently already timed out to idle video channels.

In some embodiments of the present invention, the querying, by the video server 700, a first video channel corresponding to a first user to which the first video data belongs may include: searching, based on a multiple-Hash algorithm (or a traversal algorithm or another algorithm), for whether a record used for identifying a mapping relationship between the first user and the first video channel is stored in a mapping record storage area, and if the record used for identifying the mapping relationship between the first user and the first video channel is not found in the mapping record storage area, determining that the first video channel corresponding to the first user is not found through the querying successfully, or if the record used for identifying the mapping relationship between the first user and the first video channel is found in the mapping record storage area, determining that the first video channel corresponding to the first user is found through the querying successfully.

In some embodiments of the present invention, the video server 700 may further generate a second record used for identifying a mapping relationship between the first user and the second video channel, perform calculation based on the multiple-Hash algorithm to obtain a second storage address, and write the second record to second storage space to which the second storage address points, where the second storage space belongs to the mapping record storage area.

In some embodiments of the present invention, an input of the foregoing multiple-Hash algorithm is, for example, user code of the first user (where the user code is several digits), where the user code of the first user is the user identifier of the first user or is obtained by means of conversion based on the user identifier of the first user.

In some embodiments of the present invention, K≥N*M*P, where K denotes the size of total storage space of the foregoing mapping record storage area, M denotes a total quantity of video channels that the foregoing video server can provide, P denotes the size of storage space occupied by storage of a record used for identifying a mapping relationship between a user and a video channel, and N is a positive integer. For example, N may be equal to, for example, 1, 2, 3, 4, 5, 6 or another value.

For example, assuming that P=10 bytes, M is equal to 100, and N is equal to 6, K may be greater than or equal to 6000 bytes. Because addressing space of the mapping record storage area is greater than or equal to the total quantity of the video channels that the video server can provide, it helps allocate as fully as possible the video channels that the video server can provide, and also facilitates improvement in video channel utilization.

For example, the mapping record storage area may include at least N mapping record storage sub-areas, and the size of storage space of each mapping record storage sub-area is greater than or equal to M*P, where M denotes a total quantity of video channels that the foregoing video server can provide, and P denotes the size of storage space occupied by storage of a record used for identifying a mapping relationship between a user and a video channel. However, in this scenario, each single-Hash algorithm in the multiple-Hash algorithm may correspond to different mapping record storage sub-areas, and denominators of the single-Hash algorithms are different, and may be prime numbers less than M.

In some embodiments of the present invention, the channel resetting condition may be various feasible conditions that are set according to actual scenario needs. For example, the channel resetting condition may include at least one of the following conditions: a quantity of video channels that are currently idle is less than a first threshold (such as 10 or another value), a proportion of a quantity of video channels that are currently idle to a total channel quantity is less than a second threshold (such as 15% or another value), a timeout video channel resetting instruction is received, a quantity of video channels that are currently already timed out is greater than a third threshold (such as 20 or another value), a set resetting period (such as 1 minute, two minutes or another value) arrives, a proportion of a quantity of video channels that are currently already timed out to a total channel quantity is greater than a fourth threshold (such as 50% or another value), and a ratio of a quantity of video channels that are currently already timed out to a quantity of video channels that are currently idle is greater than a fifth threshold (such as 100% or another value).

In some embodiments of the present invention, the video server 700 may reset, for example, when a quantity of video channels that are currently idle is less than a first threshold, the some or all video channels that are currently already timed out to idle video channels; or reset, when a proportion of a quantity of video channels that are currently idle to a total channel quantity is less than a second threshold, the some or all video channels that are currently already timed out to idle video channels; or reset, when a timeout video channel resetting instruction is received, the some or all video channels that are currently already timed out to idle video channels; or reset, when a set resetting period arrives, the some or all video channels that are currently already timed out to idle video channels; or reset, when a quantity of video channels that are currently already timed out is greater than a third threshold, the some or all video channels that are currently already timed out to idle video channels; or reset, when a proportion of a quantity of video channels that are currently already timed out to a total channel quantity is greater than a fourth threshold, the some or all video channels that are currently already timed out to idle video channels; or reset, when a ratio of a quantity of video channels that are currently already timed out to a quantity of video channels that are currently idle is greater than a fifth threshold, the some or all video channels that are currently already timed out to idle video channels.

Figure 7:
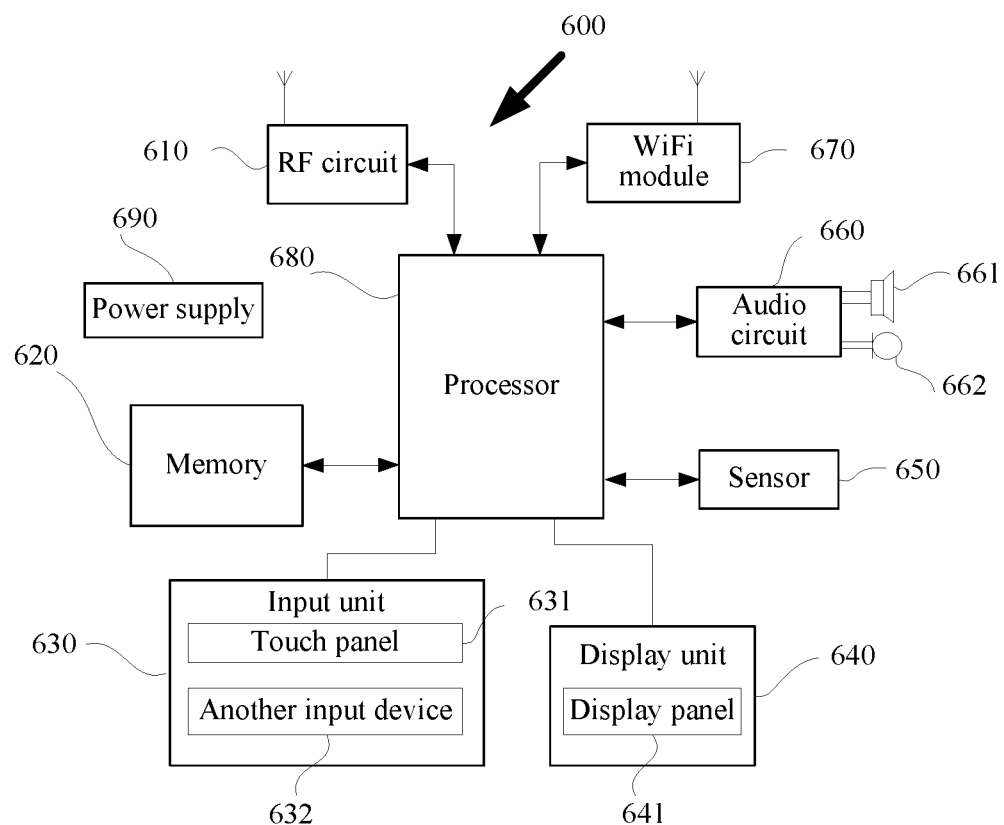
FIG. 7 is a schematic diagram of a user terminal according to an embodiment of the present invention.

As shown in FIG. 7, for convenience of description, only a part related to the embodiments of the present invention is shown, and for specific technical details that are not disclosed, refer to the method part of the embodiments of the present invention. A user terminal 600 shown in FIG. 7 may be any terminal device such as a mobile phone, a tablet computer, a personal digital assistant (PDA), a point of sales (POS), or a vehicle-mounted computer, and an example in which the user terminal 600 is a mobile phone is mainly used below:

FIG. 7 shows a block diagram of a partial structure of a mobile phone related to the terminal provided in this embodiment of the present invention. Referring to FIG. 7, the mobile phone includes: components such as a radio frequency (RF) circuit 610, a memory 620, an input unit 630, a wireless fidelity (WiFi) module 670, a display unit 640, a sensor 650, an audio circuit 660, a processor 680, and a power supply 690.

A person skilled in the art may understand that the structure of the mobile phone shown in FIG. 7 does not constitute a limitation to the mobile phone, and the mobile phone may include more components or fewer components than those shown in the figure, or some components may be combined, or a different component deployment may be used.

Each component part of the mobile phone is described below in detail with reference to FIG. 7.

The RF circuit 610 may be configured to receive and send a signal during an information receiving and sending process or a call process. Specifically, the RF circuit receives downlink information from a base station, then delivers the downlink information to the processor 680 for processing, and sends related uplink data to the base station. Generally, the RF circuit includes, but is not limited to, an antenna, at least one amplifier, a transceiver, a coupler, a low noise amplifier (LNA), and a duplexer. In addition, the RF circuit 60 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 620 may be configured to store a software program and module (e.g., a program for collecting and sending video data). The processor 680 runs the software program and module stored in the memory 620, to implement various functional applications and data processing of the mobile phone. The memory 620 may mainly include a program storage area and a data storage area. The program storage area may store an operating system, an application program required by at least one function (such as a sound playback function and an image display function), and the like. The data storage area may store data (such as audio data and an address book) created according to use of the mobile phone, and the like. In addition, the memory 620 may include a high speed random access memory, and may also include a non-volatile memory, such as at least one magnetic disk storage device, a flash memory, or another volatile solid storage device.

The input unit 630 may be configured to receive input digit or character information, and generate key signal input related to the user setting and function control of the mobile phone 600. Specifically, the input unit 630 may include a touch panel 631 and another input device 632. The touch panel 631 may also be referred to as a touch screen, and may collect a touch operation of a user on or near the touch panel (such as an operation of a user on or near the touch panel 631 by using any suitable object or attachment, such as a finger or a touch pen), and drive a corresponding connection apparatus according to a preset program. Optionally, the touch panel 631 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 680. Moreover, the touch controller can receive and execute a command sent from the processor 680. In addition, the touch panel 631 may be implemented by using various types, such as a resistive type, a capacitance type, an infrared type, and a surface sound wave type. In addition to the touch panel 631, the input unit 630 may further include the another input device 632. Specifically, the another input device 632 may include, but is not limited to, one or more of a physical keyboard, a functional key (such as a volume control key or a switch key), a track ball, a mouse, a joystick, and the like.

The display unit 640 may be configured to display information input by the user or information provided for the user, and various menus of the mobile phone. The display unit 640 may include a display panel 641. Optionally, the display panel 641 may be configured by using a liquid crystal display (LCD), an organic light-emitting diode (OLED), or the like. Further, the touch panel 631 may cover the display panel 641. After detecting a touch operation on or near the touch panel 631, the touch panel 631 transfers the touch operation to the processor 680, so as to determine a type of a touch event. Then, the processor 680 provides corresponding visual output on the display panel 641 according to the type of the touch event. Although, in FIG. 7, the touch panel 631 and the display panel 641 are used as two separate parts to implement input and output functions of the mobile phone, in some embodiments, the touch panel 631 and the display panel 641 may be integrated to implement the input and output functions of the mobile phone.

The mobile phone 600 may further include at least one sensor 650, such as, a light sensor, a motion sensor, or other sensors. Specifically, the optical sensor may include an ambient light sensor and a proximity sensor. The ambient light sensor may adjust luminance of the display panel 641 according to brightness of the ambient light. The proximity sensor may switch off the display panel 641 and/or backlight when the mobile phone is moved to the ear. As one type of motion sensor, an accelerometer sensor may detect magnitude of accelerations at various directions (which generally are tri-axial), may detect magnitude and a direction of the gravity when static, and may be configured to identify an application of a mobile phone gesture (such as switchover between horizontal and vertical screens, a related game, and gesture calibration of a magnetometer), a related function of vibration identification (such as a pedometer and a knock). Other sensors, such as a gyroscope, a barometer, a hygrometer, a thermometer, and an infrared sensor, which may be configured in the mobile phone are not further described herein.

The audio circuit 660, a loudspeaker 661, and a microphone 662 may provide audio interfaces between the user and the mobile phone. The audio circuit 660 may transmit, to the loudspeaker 661, an electric signal converted from received audio data. The loudspeaker 661 converts the electric signal into a sound signal for output. On the other hand, the microphone 662 converts a collected sound signal into an electric signal. The audio circuit 660 receives the electric signal and converts the electric signal into audio data, and outputs the audio data to the processor 680 for processing. Then, the processor 580 sends the audio data to, for example, another mobile phone by using the RF circuit 610, or outputs the audio data to the memory 620 for further processing.

WiFi belongs to a short distance wireless transmission technology. The mobile phone may help, by using the WiFi module 670, a user to receive and send an e-mail, browse a webpage, access stream media, and the like, which provides wireless broadband Internet access for the user. Although FIG. 7 shows the WiFi module 670, it may be understood that, the WiFi module 170 does not belong to a necessary constitution of the mobile phone 600, and can be ignored according to demands without changing the scope of the essence of the present disclosure.

The processor 680 is a control center of the mobile phone, and connects to various parts of the mobile phone by using various interfaces and lines. By running or executing the software program and/or module stored in the memory 620, and invoking data stored in the memory 620, the processor 580 performs various functions and data processing of the mobile phone, thereby performing overall monitoring on the mobile phone. Optionally, the processor 680 may include one or more processing units. Preferably, the processor 680 may integrate an application processor and a modem. The application processor mainly processes an operating system, a user interface, an application program, and the like. The modem mainly processes wireless communication. It may be understood that, the foregoing modem may also not be integrated into the processor 680.

The mobile phone 600 further includes the power supply 690 (such as a battery) for supplying power to the components. Preferably, the power supply may logically connect to the processor 680 by using a power supply management system, thereby implementing functions, such as charging, discharging, and power consumption management, by using the power supply management system. Although not shown in the figure, the mobile phone 600 may further include a camera, a Bluetooth module, and the like, which are not further described herein.

In this embodiment of the present invention, the processor 680 included in the user terminal further has the following function: sending first video data to a video server. For example, an application may be installed on the user terminal 600 and executed by the processor 680 to facilitate sending the first video data. The application may provide a user interface for a user to record a video data in real time by the camera and/or audio circuit 660 and send the real-time video data to the video server 700 through the WiFi module 670 or RF circuit 610. The user may also select a video data from memory 620 or cloud storage on the user interface, and the selected video data may be sent to the video server 700. When the video server 700 fails to allocate a video channel for the received video data, the video server 700 may inform the application to display a failure notice. When the video server 700 successfully allocates a video channel for the received video data, the video server 700 may inform the application to display a success message. When the user terminal 600 is collecting and sending live video data to the video server 700, the video server 700 may continuously use the allocated video channel to receive the live video data.

The application installed on the user terminal 600 may be further configured to receive and watch video data from one or more other users transmitted by the video server 700. The other users may use a user terminal 600 to send video data to the video server 700. For example, the application may facilitate a multi-user video conference hosted by the video server 700. The user interface of the application may show icons of multiple participants in the video conference, and display live video data of some or all participants transmitted from the video server 700. Each live video data of some or all participants may be allocated with its own video channel by the video server 700.

In another example, the application installed on the user terminal 600 may be a video streaming/sharing software program. The application may connect to the video server 700 and broadcast/share his/her own video data. Further, the application may connect to the video server 700 and browse/watch live streaming video data from other users, or browse/watch video data previously streamed or previously uploaded by the user himself or other users.

The embodiments of the present invention further provide a computer storage medium, where the computer storage medium can store a program, and when being executed, the program includes some or all steps of the video channel allocation management method recorded in the method embodiments.

It should be noted that the foregoing method embodiments are expressed as a series of action combinations for the purpose of brief description, but a person of ordinary skills in the art should know that because some steps may be performed in other sequences or simultaneously according to the present disclosure, the present disclosure is not limited to a described action sequence. In addition, a person skilled in the art should also know that the embodiments described in this specification are all preferred embodiments; and therefore, an action and a module involved are not necessarily mandatory in the present disclosure.

In the foregoing embodiments, descriptions of the embodiments have different emphases, and as for parts that are not described in detail in one embodiment, reference can be made to the relevant description of the other embodiments.

In the several embodiments provided in the present application, it should be understood that the disclosed apparatus may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and the parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units may be integrated into one unit. The integrated unit may be implemented in the form of hardware, or may be implemented in the form of a software functional unit.

When the integrated unit is implemented in a form of a software functional module and sold or used as an independent product, the integrated unit may be stored in a computer-readable storage medium. Based on such an understanding, the technical solutions of the present invention essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a read-only memory (ROM), a random access memory (RAM), a removable hard disk, a magnetic disk, or an optical disc.

To sum up, the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A video channel management method, comprising:
   receiving a first video data from a first user;
   querying a first video channel corresponding to the first user, comprising:
      searching, based on a multiple-Hash algorithm, a record used for identifying a mapping relationship between the first user and the first video channel in a mapping record storage area,
      if the record used for identifying the mapping relationship between the first user and the first video channel is not found in the mapping record storage area, determining that the first video channel corresponding to the first user is not found through the querying, and
      if the record used for identifying the mapping relationship between the first user and the first video channel is found in the mapping record storage area, determining that the first video channel corresponding to the first user is found through the querying;
   if the first video channel corresponding to the first user is not found through the querying, allocating a second video channel to the first user, the second video channel being a channel that is currently timed out, wherein the channel that is timed out refers to a time denoted by a time stamp corresponding to the channel lags behind a current time by over a time length threshold, wherein before the second video channel is allocated to the first user, the second video channel is allocated to a second user; and
   if the second video channel is allocated to the first user, writing the first video data to the second video channel, and tagging that the second video channel belongs to the first user.

2. The method according to claim 1, further comprising:
   if the second video channel is not allocated to the first user, allocating a third video channel to the first user, the third video channel being a channel that is currently idle; and
   if the third video channel is allocated to the first user, writing the first video data to the third video channel, and tagging that the third video channel belongs to the first user.

3. The method according to claim 1, wherein before the allocating a second video channel to the first user, the method further comprises:
   if the first video channel corresponding to the first user is not found through the querying, allocating a third video channel to the first user, the third video channel being a channel that is currently idle; and
   if the third video channel is allocated to the first user, writing the first video data to the third video channel, and tagging that the third video channel belongs to the first user, wherein
   if the third video channel fails to be allocated to the first user, the step of allocating the second video channel to the first user is performed.

4. The method according to claim 1, further comprising:
   if the first video channel corresponding to the first user is found through the querying, writing the first video data to the first video channel.

5. The method according to claim 2, further comprising:
   if the first video data is written to the first video channel, updating the time stamp of the first video channel;
   if the first video data is written to the second video channel, updating the time stamp of the second video channel; and
   if the first video data is written to the third video channel, updating the time stamp of the third video channel.

6. The method according to claim 1, further comprising:
   resetting, when a channel resetting condition is satisfied, one or more video channels that are currently timed out to idle.

7. The method according to claim 6, wherein the channel resetting condition includes at least one of:
   a quantity of video channels that are currently idle is less than a first threshold;
   a proportion of the quantity of video channels that are currently idle to a total channel quantity is less than a second threshold;
   a timeout video channel resetting instruction is received;
   a resetting period arrives;
   a quantity of video channels that are currently timed out is greater than a third threshold;
   a proportion of the quantity of video channels that are currently timed out to the total channel quantity is greater than a fourth threshold; and
   a ratio of the quantity of video channels that are currently timed out to the quantity of video channels that are currently idle is greater than a fifth threshold.

8. A video server, comprising:
   a memory; and
   a processor coupled to the memory;
   wherein the processor is configured to:
   receive a first video data from a first user;
   query a first video channel corresponding to the first user, comprising:
      search, based on a multiple-Hash algorithm, a record used for identifying a mapping relationship between the first user and the first video channel in a mapping record storage area,
      if the record used for identifying the mapping relationship between the first user and the first video channel is not found in the mapping record storage area, determine that the first video channel corresponding to the first user is not found through the querying, and
      if the record used for identifying the mapping relationship between the first user and the first video channel is found in the mapping record storage area is found, determine that the first video channel corresponding to the first user is found through the querying;

if the query unit does not find the first video channel corresponding to the first user through the querying, allocate a second video channel to the first user, the second video channel being a channel that is currently timed out, wherein the channel that is timed out refers to a time denoted by a time stamp corresponding to the channel lags behind a current time by over a time length threshold, wherein before the second video channel is allocated to the first user, the second video channel is allocated to a second user; and if the allocation unit allocates the second video channel to the first user, write the first video data to the second video channel, and tag that the second video channel belongs to the first user.

9. The video server according to claim 8, wherein the processor is further configured to:

if the second video channel is not allocated to the first user, allocate a third video channel to the first user, the third video channel being a channel that is currently idle; and if the third video channel is allocated to the first user, write the first video data to the third video channel, and tag that the third video channel belongs to the first user.

10. The video server according to claim 8, wherein the processor is further configured to:

if the query unit does not find the first video channel corresponding to the first user through the querying, allocate a third video channel to the first user, the third video channel being a channel that is currently idle; and if the third video channel fails to be allocated to the first user, allocate the second video channel to the first user; and if the allocation unit allocates the third video channel to the first user, write the first video data to the third video channel, and tag that the third video channel belongs to the first user.

11. The video server according to claim 8, wherein the processor is further configured to:

if the query unit finds the first video channel corresponding to the first user through the querying, write the first video data to the first video channel.

12. The video server according to claim 8, wherein the processor is further configured to:

if the writing unit writes the first video data to the first video channel, update the time stamp of the first video channel; if the writing unit writes the first video data to the second video channel, update the time stamp of the second video channel; and if the writing unit writes the first video data to the third video channel, update the time stamp of the third video channel.

13. The video server according to claim 8, wherein the processor is further configured to:

reset, when a channel resetting condition is satisfied, on or more video channels that are currently timed out to idle.

14. The video server according to claim 13, wherein the channel resetting condition includes at least one of:

a quantity of video channels that are currently idle is less than a first threshold;

a proportion of the quantity of video channels that are currently idle to a total channel quantity is less than a second threshold;

a timeout video channel resetting instruction is received;

a resetting period arrives;

a quantity of video channels that are currently timed out is greater than a third threshold;

a proportion of the quantity of video channels that are currently timed out to the total channel quantity is greater than a fourth threshold; and a ratio of the quantity of video channels that are currently timed out to the quantity of video channels that are currently idle is greater than a fifth threshold.

15. A communication system, comprising:

a user terminal and a video server, the user terminal being configured to send a first video data from a first user to the video server; and the video server being configured to:

receive the first video data from the user terminal;

query a first video channel corresponding to the first user, comprising:

search, based on a multiple-Hash algorithm, a record used for identifying a mapping relationship between the first user and the first video channel in a mapping record storage area, if the record used for identifying the mapping relationship between the first user and the first video channel is not found in the mapping record storage area, determining that the first video channel corresponding to the first user is not found through the querying, and if the record used for identifying the mapping relationship between the first user and the first video channel is found in the mapping record storage area, determining that the first video channel corresponding to the first user is found through the querying; and if the first video channel corresponding to the first user is not found through the querying, allocate a second video channel to the first user, the second video channel being a channel that is currently timed out, wherein the channel that is timed out refers to a time denoted by a time stamp corresponding to the channel lags behind a current time by over a time length threshold, wherein before the second video channel is allocated to the first user, the second video channel is allocated to a second user; and if the second video channel is allocated to the first user, write the first video data to the second video channel, and tag that the second video channel belongs to the first user, the user terminal belonging to the first user.

16. The communication system according to claim 15, wherein the video server is further configured to: if the first video channel corresponding to the first user is found through the querying, write the first video data to the first video channel.

17. The method according to claim 1, wherein an input of the multiple-Hash algorithm is a user identifier of the first user or a user code of the first user.

18. The communication system according to claim 15, wherein the video server is further configured to:

if the second video channel is not allocated to the first user, allocate a third video channel to the first user, the third video channel being a channel that is currently idle; and if the third video channel is allocated to the first user, write the first video data to the third video channel, and tag that the third video channel belongs to the first user.

19. The communication system according to claim 15, wherein the video server is further configured to:

if the first video channel corresponding to the first user is not found through the querying, allocate a third video channel to the first user, the third video channel being a channel that is currently idle; and if the third video channel is allocated to the first user, write the first video data to the third video channel, and tag that the third video channel belongs to the first user, wherein if the third video channel fails to be allocated to the first user, the step of allocating the second video channel to the first user is performed.

20. The communication system according to claim 15, wherein the video server is further configured to:

reset, when a channel resetting condition is satisfied, one or more video channels that are currently timed out to idle.

* * * * *